United States Patent Office 3,109,523
Patented Nov. 5, 1963

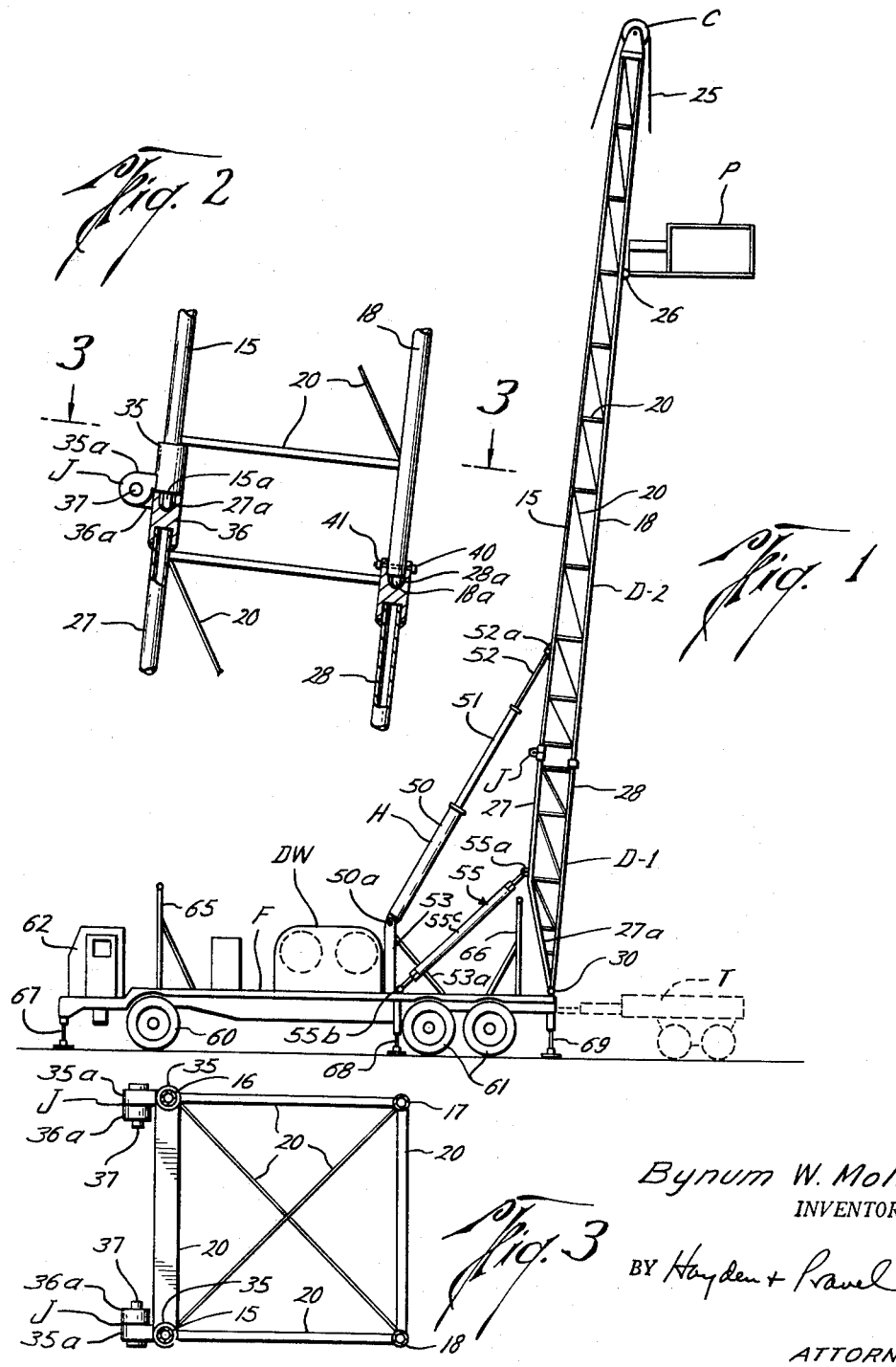

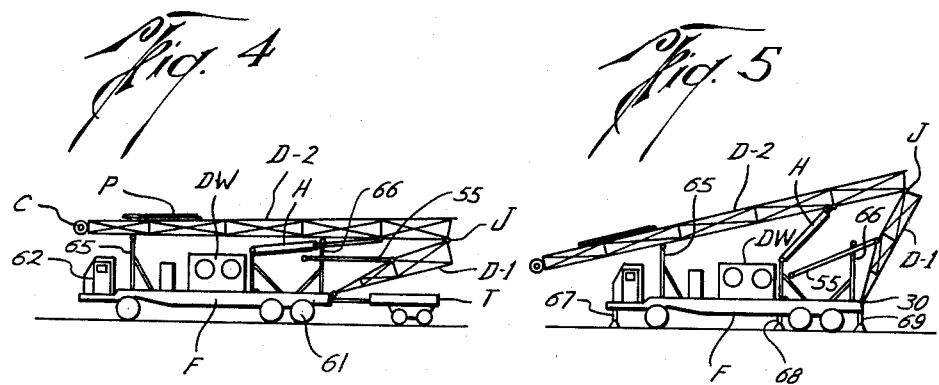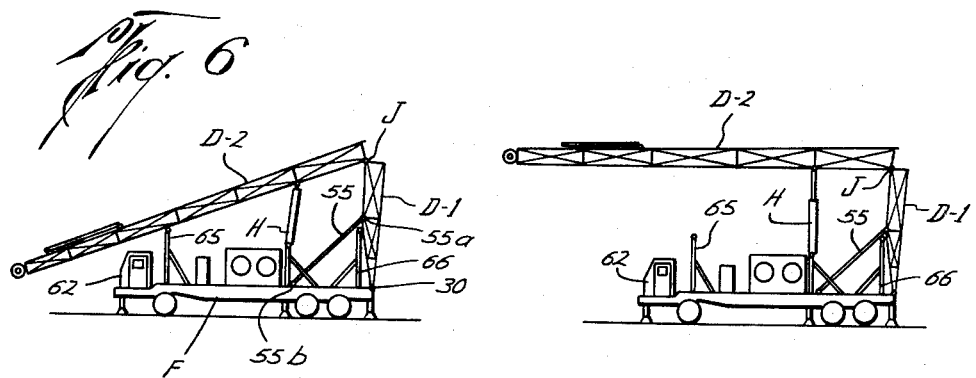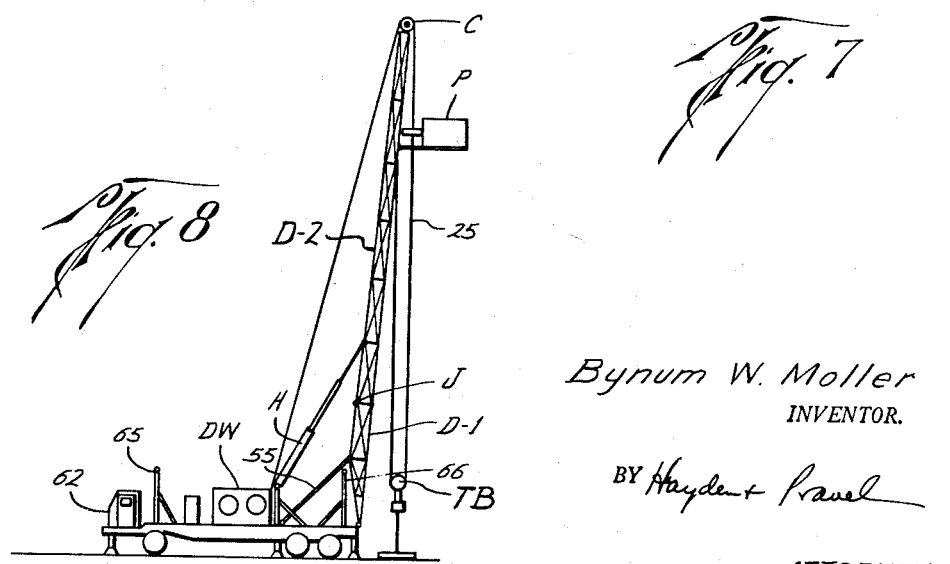

3,109,523
FOLDING DERRICK
Bynum W. Moller, Victoria, Tex., assignor to Skytop Rig
Co., Victoria, Tex., a corporation of Texas
Filed Sept. 1, 1960, Ser. No. 53,545
3 Claims. (Cl. 189—11)

This invention relates to new and useful improvements in derricks, and particularly to derricks which are adapted to be folded for transporting on roads or highways.

An object of this invention is to provide a new and improved folding derrick of simplified construction which is adapted to be folded for transporting same over roads or highways.

An important object of this invention is to provide a new and improved folding derrick having a conventional crown block which is adapted to extend substantially vertically to a height of about sixty-five feet which is adequate for handling stands of pipe consisting of two lengths of about thirty feet each, and which is capable of being folded to a length of about fifty feet in a substantially horizontal position for transportation over the road whereby the legal length limits for highway travel in the various states are not exceeded.

Another object of this invention is to provide a new and improved derrick which is formed with a lower section and an upper section, and which is so constructed and supported that the same hydraulic system folds and extends the lower derrick section and the upper derrick section for lowering and raising same without requiring any complicated toggle links or similar structure.

A further object of this invention is to provide a new and improved collapsible derrick which is adapted to be mounted on a truck bed or similar platform having a rear wheel assembly and a front wheel assembly, and wherein the load of the derrick when collapsed is balanced at a point approximately over the rear wheel assembly so that the vehicle cab, drawworks and other equipment on the truck bed may be carried by the front wheel assembly thereby distributing the weight on the truck bed to both wheel assemblies.

A specific object of this invention is to provide a new and improved derrick which has an upper derrick section and a lower derrick section each of which has longitudinally extending frame members which are aligned longitudinally when the derrick is in the raised position for use so that the load on the upper derrick section is transmitted longitudinally to the lower derrick section, whereby the strength of the derrick is increased as compared to prior known folding derricks.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a view in elevation illustrating the folding derrick of this invention in its substantially vertical position for use in drilling operations and the like;

FIG. 2 is a view, partly in elevation and partly in section illustrating a portion of the folding derrick of FIG. 1 to illustrate in particular the preferred type of pivotal connection between the upper derrick section and the lower derrick section;

FIG. 3 is a horizontal cross-sectional view taken on line 3—3 of FIG. 2; and

FIGS. 4–8 are schematic views illustrating the folding derrick of this invention starting from the transportation position of FIG. 4 and illustrating the position of the various parts of the derrick as the derrick sections are raised to the substantially vertical position of FIG. 8 for use.

In the drawings, the folding derrick of this invention is illustrated as having a lower derrick section D-1 and an upper derrick section D-2 which are pivotally connected together for folding same from a substantially vertical position as shown in FIG. 1 to a lowered or transportation position as shown in FIG. 4. The lower derrick section D-1 is mounted on a platform or float F, which will be described more in detail hereinafter. The folding of the upper derrick section D-2 and the lower derrick section D-1 from the substantially vertical position to the lowered or transportation position is accomplished with a hydraulic apparatus or system H which is itself of conventional construction. The hydraulic apparatus or system H is so mounted and connected with the float F and the upper derrick section D-2 that the lowering and raising of the derrick sections D-1 and D-2 are accomplished with the maximum of simplicity and without any connection from the hydraulic apparatus or system H to the lower derrick section D-1.

Considering the invention more in detail, and referring in particular to FIGS. 1-3, the upper derrick section D-2 is formed of a plurality of longitudinally extending frame members 15, 16, 17 and 18. Such longitudinally extending frame members 15-18 are preferably four in number as shown in FIG. 3 and preferably are arranged to define a rectangle or square in cross-section as also shown in FIG. 3. Suitable laterally and diagonally extending braces 20 may be provided throughout the full length of the upper derrick section D-2 to interconnect and brace the longitudinally extending frame members 15-18. Such frame members and the braces are welded or are otherwise secured together in any suitable known manner.

A crown block C of the conventional closed construction or of the open type construction as disclosed in United States Patent 2,742,260 is mounted on the upper end of the derrick section D-2 and is used in the conventional way for receiving the derrick hoisting line 25 (a portion of which is shown) and which is used in the conventional manner during drilling. A pipe rack and platform P is pivotally mounted to the upper derrick section D-2 by a pivot connection 26 in any known manner. Such platform P is preferably collapsible as indicated in particular in FIG. 4 so that it lays flat on the upper derrick section D-2 when the section D-2 is in the substantially horizontal position for transportation.

The derrick section D-1 is formed with the same number of longitudinally extending frame members as provided in the upper derrick section D-2 in the preferred form of the invention. Therefore, as illustrated, the derrick section D-1 has at its upper end four frame members extending longitudinally, with the longitudinally extending frame members 27 and 28 being visible in FIG. 1. The longitudinally extending frame member 27 is in longitudinal alignment with the longitudinally extending frame member 15 when the derrick is in position for use as shown in FIG. 1. Likewise, the longitudinally extending frame member 28 is in longitudinal alignment with the frame member 18 when the derrick is in position for use as shown in FIG. 1. Similarly, the longitudinally extending frame members which are not shown but which are directly behind the frame members 27 and 28 on the lower derrick section D-1 as viewed in FIG. 1, are in vertical or longitudinal alignment with the longitudinally extending frame members 16 and 17 of the upper derrick section D-2, respectively. Thus, the upper derrick section D-2 forms a continuation longitudinally of the lower derrick section D-1 so that load forces are carried by the section in a longitudinal direction and are uniformly distributed to the lower derrick section D-1 from the upper derrick section D-2.

The lower derrick section D-1 has its lowermost longitudinally extending frame member 27a and a corresponding longitudinally extending frame member therebehind in FIG. 1 positioned at an angle with respect to the longitudinally extending frame member 27 thereabove so as to form a triangular section with the frame member 28 at the lower end of the derrick section D-1.

The lower end of the derrick section D-1 is connected to the support base or float F by a suitable hinge or pivotal connection 30 which may be of any conventional construction for permitting the pivoting of the derrick section D-1 from its substantially vertical position of FIG. 1 rearwardly to a substantially horizontal or inclined position as shown in FIG. 4.

As previously pointed out, the derrick sections D-1 and D-2 are pivotally connected together in such a way that the upper derrick section D-2 is adapted to pivot forwardly and downwardly with respect to the lower derrick section D-1 when it is desired to retract or lower the derrick from its substantially vertical position to a transportation position. Such connection between the derrick sections is shown in detail in FIG. 2 with respect to the legs 15 and 18 of the section D-2 and the legs 27 and 28 of the section D-1. The connection between the legs 16 and 17 of the section D-2 and the legs or longitudinal frame members of the section D-1 therebelow is not shown in detail since such construction would be a duplicate of that shown in FIG. 2 for the legs 15 and 18. The longitudinally extending frame member or leg 15 is pivotally connected to the longitudinally extending frame member or leg 27 by a hinged joint J which may be formed in numerous ways, but as illustrated includes an upper collar 35 which is welded or is otherwise secured to the exterior of the leg 15 near its lower end. A portion 15a of the leg 15 extends below such collar 35 as shown in FIG. 2. The collar 35 is connected to a hinge or joint arm 35a by welding or any other suitable means. Such joint or hinge arm 35a is pivotally connected to another joint or hinge arm 36a by means of a hinge pin 37. The hinge or joint arm 36a is welded or otherwise affixed to a collar 36 which is welded or otherwise secured to the upper end of the leg 27. The upper end of the member or leg 27 is formed with a socket or opening 27a for receiving the lower extension 15a of the longitudinally extending member or leg 15. When such extension 15a is within the socket 27a, lateral movement of the leg 15 with respect to the leg 27 is prevented. A similar joint J and ball and socket connection is provided between the leg 16 of the derrick section D-2 and the corresponding longitudinal leg of the section D-1 therebelow as indicated in FIG. 3.

The longitudinally extending member or leg 18 is longer than the leg 15 and it is provided with a ball or end 18a which is adapted to extend into any suitable type of opening or socket 28a provided in the upper end of the longitudinally extending member or leg 28. Lateral shifting of the legs 18 and 28 with respect to each other is therefore prevented when the end 18a is within the socket 28a. In order to prevent inadvertent disengagement of the legs 18 and 28, a locking bolt or pin 40 may be positioned through aligned openings in the lower end of the leg 18 and the upper end of the leg 28. A nut 41 would be preferably threaded to the bolt 40, although it will be appreciated that other suitable locking means may be employed if desired. Also, it will be understood that such locking means is not necessary to retain the derrick sections together. The leg 17 is likewise secured in a suitable socket in the longitudinal leg or member of the derrick section D-1 therebelow in the same manner as described in connection with the legs 18 and 28. Thus, when the derrick section D-2 is pivoted at the pivotal connections provided by the joints or hinges J to its substantially vertical position as shown in FIG. 1, the longitudinally extending members or legs of the upper section D-2 are in longitudinal alignment with the longitudinally extending members or legs of the lower section D-1 and are prevented from lateral shifting with respect thereto.

The fluid actuated operating assembly H is preferably a double acting hydraulic cylinder of a conventional construction having a cylinder 50 and telescoping piston rods 51 and 52. The upper end of the assembly H is pivotally connected at 52a by any suitable pivot connection to the frame members of the upper derrick section D-2 as shown in FIG. 1. The lower end of the assembly H is pivotally connected at 50a by any suitable pivotal connection to an upstanding post or support 53 which is secured to the base or float F. A brace 53a is preferably provided for strengthening the post 53 in anchoring it to the base or float F. In use, the assembly H is of the type which is adapted to exert both a pull and a push depending upon the direction of the fluid supplied to the cylinder 50, as will be understood, it is to be noted that the pivotal connection 50a of the cylinder 50 is above the pivotal connection 30 so that a lifting force is imparted to the lower derrick section D-1 to lift it from its substantially horizontal or transportation position (FIG. 4) to its raised position (FIG. 6).

A pair of anchoring turnbuckles 55 are provided for anchoring the lower section D-1 to the float F. Each turnbuckle 55 is pivotally connected at a pivot connection 55a to the derrick section D-1 and it is provided with an anchoring head 55b at its lower end for securing it to the support base or float F when the derrick section D-1 is in its substantially vertical position. During the raising and lowering of the lower derrick section D-1, the lower connection 55b or upper connection 55a is disconnected from the support base or float F. Each turnbuckle 55 is adapted to be lengthened or shortened in the usual manner by turning the central internally threaded turnbuckle tube 55c. When the turnbuckles 55 are lengthened, the derrick section D-1 is moved rearwardly, and conversely, when the turnbuckles 55 are shortened, the derrick section D-1 is moved forwardly. The upper derrick section D-2 moves with the lower section D-1 during such adjustment so that the movement of the turnbuckles 55 actually moves the line 25 and the travelling block TB (FIG. 8) thereon. Such movement of the block TB is necessary to align the block vertically over the well bore in some circumstances such as when the ground level at the well location is not perfectly level, or if the derrick has not been located exactly at the correct position relative to the well.

Another important purpose of the turnbuckles 55 is to transmit part of the load on the derrick (e.g. pipe suspended in well) to the vehicle frame F at the pivot 55b and then to the ground through the jacks 67 and 68. In thus transmitting part of the rig load downwardly to the vehicle frame F, it approximately counterbalances the load of the drill line from the drawworks DW which tends to lift up the frame F. This stabilizes the complete vehicle and prevents it from raising and lowering as pipe is respectively picked up and then set on pipe slips, or when similar operations are performed.

The support base or float F is preferably constructed with the drawworks DW of conventional construction at an intermediate point for the handling of the hoisting line 25 and also for supplying driving power to the wheels 60 and 61 of the float F for the transportation of the derrick over the highways or roads. If the engine of the drawworks DW is used as the driving means for the float F, an additional vehicle engine is not required, although it will be appreciated that the float F may be driven by a separate engine connected to the wheels on the float, if desired.

As illustrated, the support base or float F is provided with single wheels 60 at the front and tandem wheels 61 at the rear. As will be more evident hereinafter, the bulk of the weight of the derrick, when folded to the transportation position, is carried by the tandem wheels 61 at the rear of the float F so that the remainder of the float F is utilized for the distribution of the weight of the drawworks DW and the rest of the auxiliary apparatus. A cab 62 for the driver is positioned at the forward or front end of the float F and it of course has a suitable steering mechanism connected to the wheels 60 for driving the apparatus over the highways or roads.

Upstanding support frames 65 and 66 are provided at the forward and rear ends of the float F, respectively, for supporting the upper derrick section D-2 (FIG. 4) at spaced points when the derrick is in the transportation position. In order to stabilize the float F when the derrick is in the raised or substantially vertical position, mechanical or hydraulic jacks 67, 68 and 69 are preferably provided at suitably spaced points throughout the length of the float F. Such jacks prevent a tilting of the float F and level such float F in the event the float is on uneven ground. The jacks 67, 68 and 69 are provided on both sides of the float F and are preferably of the retractable type which remain with the float F during transportation. The load supported by the derrick is transmitted through the longitudinal legs of the derrick sections downwardly and a portion of such load is transferred to the rear jacks 69 through the pivot 30 while the remainder of the load is transmitted through the turnbuckles 55 to the front jack 67 and the intermediate jacks 68 to stabilize the vehicle frame by reason of such load distribution.

During transportation of the derrick over highways or roads, an additional tool truck or trailer T (shown in dotted lines in FIG. 1) may be connected to the rear of the float F and is positioned below the rear portion of the derrick when in the folded position (FIG. 4).

The operation or use of the derrick of this invention is illustrated in particular in FIGS. 4-8, wherein consecutive positions of the derrick are shown from the transportation position of FIG. 4 to the raised position of FIG. 8. Thus, during the transportation of the derrick of this invention, it is folded as shown in FIG. 4 with the derrick sections in substantially horizontal positions. The lower derrick section D-1 is inclined more than the upper derrick section D-2, and it will be observed that the overall length of the derrick when in the folded condition is only the length of the upper derrick section since the lower derrick section is folded underneath the upper derrick section.

When it is desired to raise the derrick, the hydraulic assembly H is actuated to exert a pulling force on the upper derrick section D-2 to pull same forwardly as indicated in FIG. 5. The forward movement of the derrick section D-2 is transmitted to the derrick section D-1 to cause same to pivot about its pivotal connection 30 on the float F for thereby raising the derrick section D-1 to its substantially vertical position shown in FIG. 6. During such raising of the section D-1, the section D-2 slides or rolls on the support 65 so that the section D-2 moves forwardly and downwardly as can be seen by comparing FIGS. 4, 5, 6. When the derrick section D-1 has reached its substantially vertical position as shown in FIG. 6, the anchoring or securing means 55 is connected at 55b to the float F so as to hold the derrick section D-1 against further forward or rearward movement. The pulling of the derrick section D-2 forwardly with the assembly H is also stopped and the direction of movement of the pistons in the assembly H is reversed to impart a pushing or lifting force to the upper section D-2 as shown in FIG. 7. Since the lower derrick section D-1 is firmly anchored in position as the pushing or lifting force is imparted to the derrick section D-2, the derrick section D-2 pivots about its pivotal connection at the joints J and moves upwardly and rearwardly until the lower ends of the legs 15, 16, 17 and 18 are received within the respective sockets or open upper ends of the legs of the lower derrick section D-1 therebelow, which position is illustrated in FIGS. 1, 2 and 8. If desired, the locking bolt or pin 40 may be utilized for securing the leg 18 to the leg 28 and a corresponding locking bolt or pin may be utilized for securing the leg 17 to the frame member or leg of the derrick D-1 therebelow. It is to be noted that the derrick sections D-1 and D-2 are actually at a slight inclination or angle with respect to the vertical so that the hoisting line 25 is offset with respect thereto in the usual manner, and as used throughout this specification and the claims, such position of the derrick as shown in FIGS. 1 and 8 is referred to as substantially vertical. The platform P is folded out to its position as shown in FIGS. 1 and 8 when the derrick has been raised to its fully extended and substantially vertical position.

When it is desired to retract or lower the derrick from its substantially vertical position for use to its substantially horizontal position for transportation, the reverse procedure to that explained above is utilized. Thus, the locking pin or pins 40, if used, are removed and then the hydraulic assembly H is motivated for pulling the derrick section D-2 forwardly and downwardly. After the derrick section D-2 has passed the vertical position and has moved forwardly thereof, its own weight will cause it to lower and the hydraulic assembly H will actually be used for retarding the speed of the lowering. When the upper derrick section D-2 reaches the position shown in FIG. 6, the connection 55b is released to thereby release the lower derrick section D-1 for pivotal movement about its pivotal connection 30 with the float F. Then, the hydraulic assembly pushes the upper derrick section D-2 rearwardly to move the lower derrick section D-1 downwardly and rearwardly as shown in FIG. 5, and such movement continues until the derrick sections have reached the position of FIG. 4. Actually, when the front end of the upper section D-2 is supported on the front support 65 as shown in FIG. 6, the weight balance is such that the weight of the lower derrick section D-1 together with the weight of the portion of the upper derrick section to the right of the hydraulic assembly H (as viewed in FIG. 6) causes a downward and rearward movement of the section D-1 after an initial period of pushing by the hydraulic assembly H. Thus, after the initial pushing, the hydraulic assembly H serves to lower the section D-1 at a controlled rate until the section D-2 rests upon the rear support 66 also. In the position of FIG. 4, the derrick may be transported and will have the proper height and length for meeting the requirements of the various states for transportation over the highways. The shortening of the length of the structure for transportation does not, however, prevent the handling of double stands of pipe of approximately sixty feet in length because the overall height of the derrick when in its drilling position (FIG. 1) is approximately sixty-five feet. However, in the transportation position (FIG. 4) the length of the derrick is no greater than fifty feet. Also, the height of the entire apparatus from the road or highway level does not exceed the legal requirement for road travel of approximately twelve feet, even though the derrick section D-1 is itself normally approximately fifteen feet in height. This is accomplished because of the folding underneath of the derrick section D-1 below the upper derrick section D-2.

From the aforesaid description, it is believed evident that a portable derrick has been provided which is adapted to be folded to reduce its overall length from its use position so that it can be transported over the highways and roads without exceeding legal limits on length and height. Additionally, the derrick construction of this invention is relatively simple and utilizes an assembly, preferably hydraulic, which acts through its connection to only the upper derrick section D-2 for accomplishing the raising and lowering of both of the derrick sections. Other features have been pointed out heretofore and still others will be evident to those skilled in the art.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A folding derrick comprising, a support base, a lower derrick section, means pivotally connecting said lower derrick section to said support base for pivotal movement rearwardly from a substantially vertical position, an upper derrick section, means pivotally connecting said upper derrick section to said lower derrick section for pivotal movement of said upper derrick section forwardly from a substantially vertical position, a double-acting fluid-operated actuating assembly having its upper end connected to an intermediate portion only of said upper derrick section and having its lower end connected to said support base for pivotal movement with respect thereto, said upper end being disposed rearwardly of said lower end when said lower derrick section is inclined rearwardly from its substantially vertical position, and means for applying fluid pressure in said assembly for pivoting both said upper derrick section and said lower derrick section to their substantially vertical position by pulling on said upper derrick section to move said lower derrick section forwardly as a unit to a substantially vertical position and to push said upper derrick section upwardly to said substantially vertical position.

2. A folding derrick comprising, a support base, a lower derrick section, means pivotally connecting said lower derrick section to said support base for pivotal movement rearwardly from a substantially vertical position, an upper derrick section, means pivotally connecting said upper derrick section to said lower derrick section for pivotal movement of said upper derrick section forwardly from a substantially vertical position, a double-acting fluid-operated actuating assembly having its upper end connected to an intermediate portion only of said upper derrick section and having its lower end connected to said support base for pivotal movement with respect thereto, said upper end being disposed rearwardly of said lower end when said lower derrick section is inclined rearwardly from its substantially vertical position, means for applying fluid pressure in said assembly for pivoting both said upper derrick section and said lower derrick section to their substantially vertical position by pulling on said upper derrick section to move said lower derrick section forwardly as a unit to a substantially vertical position and to push said upper derrick section upwardly to said substantially vertical position, and rigid connecting means connected to said lower derrick section and said support base when said lower derrick section is in said substantially vertical position.

3. A folding derrick comprising, a support base, a lower derrick section, means pivotally connecting said lower derrick section to said support base for pivotal movement rearwardly from a substantially vertical position, an upper derrick section, means pivotally connecting said upper derrick section to said lower derrick section for pivotal movement of said upper derrick section forwardly from a substantially vertical position, a double-acting fluid-operated actuating assembly having its upper end connected to an intermediate portion only of said upper derrick section and having its lower end connected to said support base for pivotal movement with respect thereto, said upper end being disposed rearwardly of said lower end when said lower derrick section is inclined rearwardly from its substantially vertical position, means for applying fluid pressure in said assembly for pivoting both said upper derrick section and said lower derrick section to their substantially vertical position by pulling on said upper derrick section to move said lower derrick section forwardly as a unit to a substantially vertical position and to push said upper derrick section upwardly to said substantially vertical position, rigid connecting means connected to said lower derrick section and said support base when said lower derrick section is in said substantially vertical position said upper derrick section and said lower derrick section each having a plurality of longitudinally extending frame members, and interengaging pin and socket means on said frame members which interfit for holding said derrick sections together in said substantially vertical position.

References Cited in the file of this patent
UNITED STATES PATENTS

| | | |
|---|---|---|
| 2,364,851 | Johansen | Dec. 12, 1944 |
| 2,660,268 | Selberg | Nov. 24, 1953 |
| 2,664,976 | Woolslayer et al. | Jan. 5, 1954 |
| 2,742,260 | Patterson | Apr. 17, 1956 |
| 2,829,741 | Selberg et al. | Apr. 8, 1958 |